United States Patent [19]

Woods

[11] Patent Number: 5,000,508
[45] Date of Patent: Mar. 19, 1991

[54] WIND DRAG REDUCTION DEVICE FOR VEHICLES

[75] Inventor: Gordon K. Woods, Phoenix, Ariz.

[73] Assignee: Norman F. Woods, Las Vegas, Nev.

[21] Appl. No.: 498,140

[22] Filed: Mar. 21, 1990

[51] Int. Cl.$^5$ ............................................. B62D 35/00
[52] U.S. Cl. .................................................. 296/180.5
[58] Field of Search .............. 296/180.4, 180.2, 180.3, 296/180.1, 180.5

[56] References Cited

U.S. PATENT DOCUMENTS

| | | | |
|---|---|---|---|
| Re. 25,914 | 11/1965 | Richter et al. | 296/181 |
| 1,880,844 | 10/1932 | Curtiss | 296/181 |
| 2,159,671 | 5/1939 | Owen | 296/181 |
| 2,737,411 | 3/1956 | Potter | 296/180.4 |
| 2,858,580 | 11/1958 | Thompson et al. | 296/39.3 |
| 3,163,435 | 12/1964 | Krueger et al. | 280/5 |
| 3,253,855 | 5/1966 | Zijlstra | 296/901 |
| 3,814,472 | 6/1974 | Zelikovitz | 296/180.4 |
| 3,934,922 | 1/1976 | MacCready, Jr. et al. | 296/180.4 |
| 4,022,508 | 5/1977 | Kirsch et al. | 296/180.2 |
| 4,030,779 | 6/1977 | Johnson | 296/180.2 |
| 4,036,519 | 7/1977 | Servais et al. | 296/18.2 |
| 4,057,280 | 11/1977 | MacCready, Jr. et al. | 296/180.4 |
| 4,088,362 | 5/1978 | Mollura | 296/180.4 |
| 4,468,061 | 8/1984 | Blake | 296/24.1 |
| 4,688,841 | 8/1987 | Moore | 296/180.4 |
| 4,702,509 | 10/1987 | Elliott, Sr. | 296/180.4 |
| 4,707,015 | 11/1987 | Klomfass | 296/180.4 |
| 4,727,814 | 3/1988 | Nielsen | 105/1.1 |
| 4,741,569 | 5/1988 | Sutphen | 296/180.4 |
| 4,767,132 | 8/1988 | Avery | 296/181 |

*Primary Examiner*—Robert R. Song
*Attorney, Agent, or Firm*—Townsend and Townsend

[57] ABSTRACT

An air drag reduction unit for reducing air drag caused by the upper surface, corners and edges of a vehicle such as a truck or trailer. The air drag reduction unit is an inflatable shell that is mounted onto the upper surface of the vehicle. The shell includes a flat rigid sheet surrounded by a flexible curtain. When the vehicle achieves a predetermined speed, the shell inflates due to the Bernoulli effect. The inflated shell has rounded corners and a flat upper surface several inches above the upper surface of the vehicle, thereby reducing drag. When the vehicle slows below the predetermined speed, the shell deflates. Due to the elastic nature of the shell, the shell contracts onto the upper surface of the vehicle, thereby not substantially adding to the dimensions of the vehicle when deflated.

19 Claims, 5 Drawing Sheets

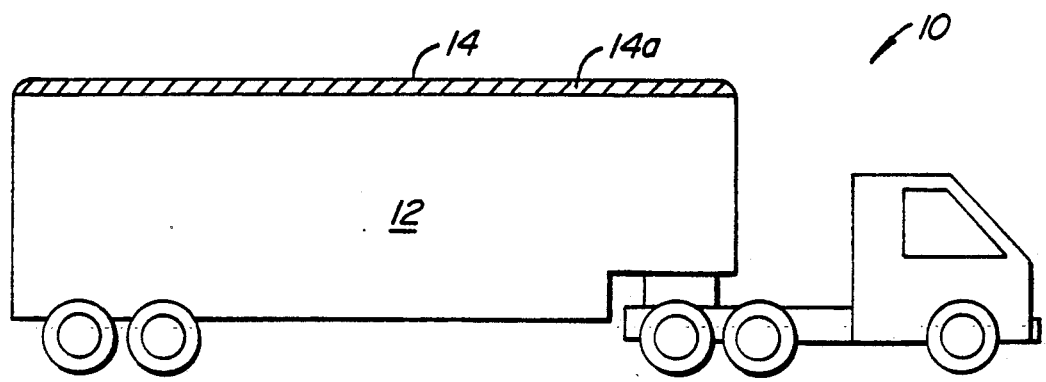
FIG._1a.
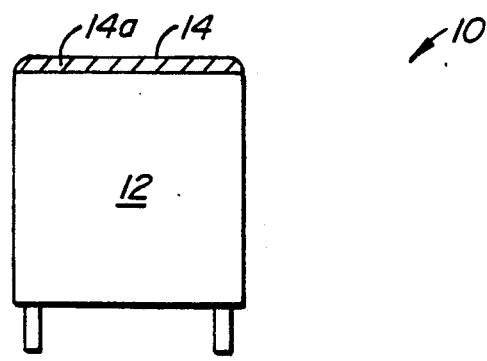
FIG._1b.
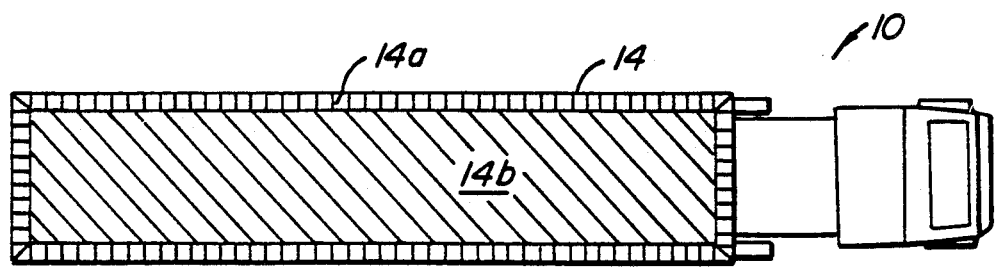
FIG._1c.

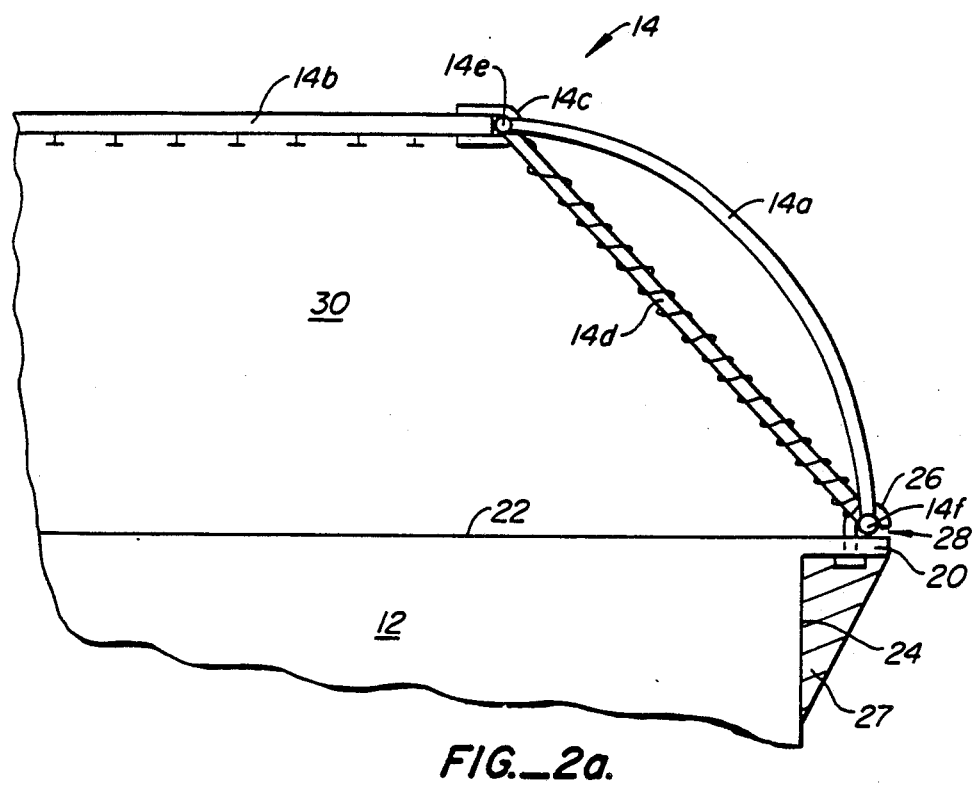
FIG._2a.
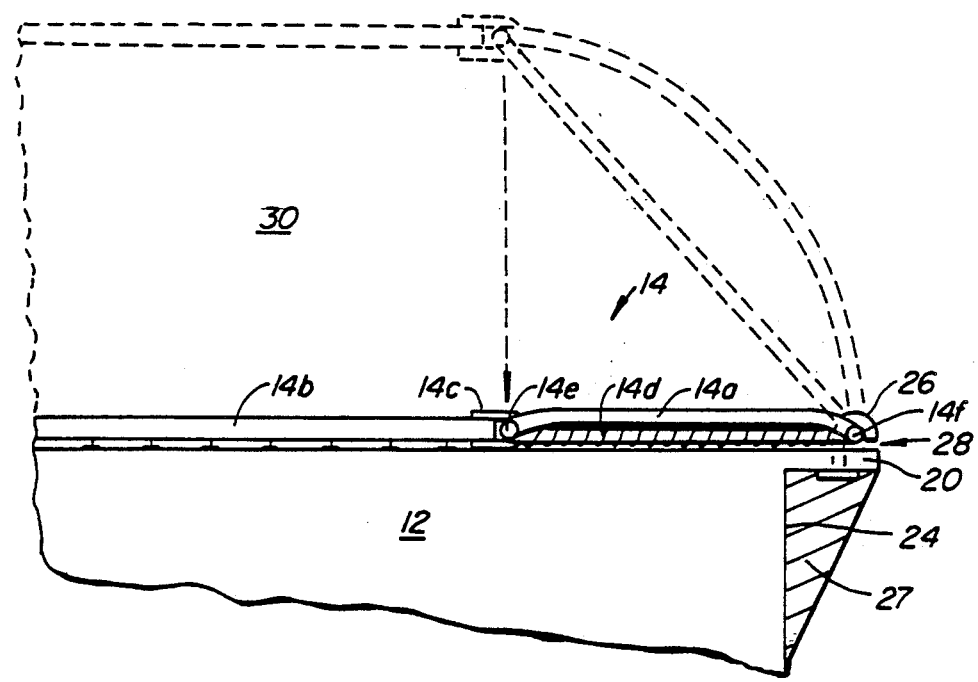
FIG._2b.

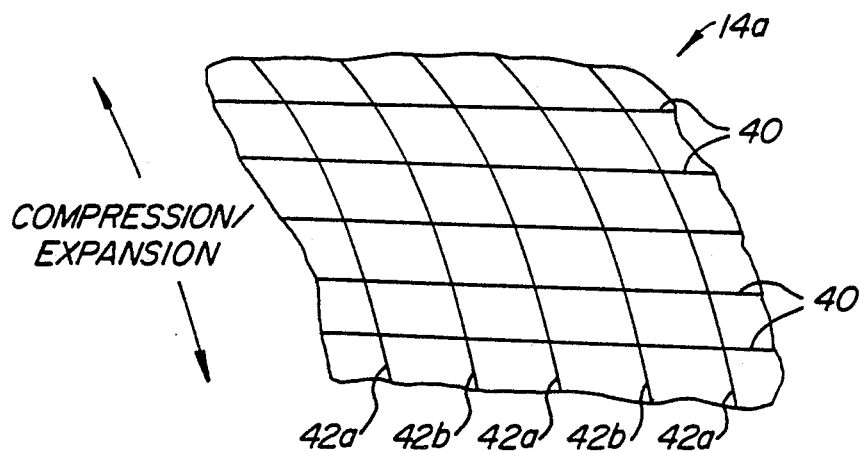
FIG._3a.
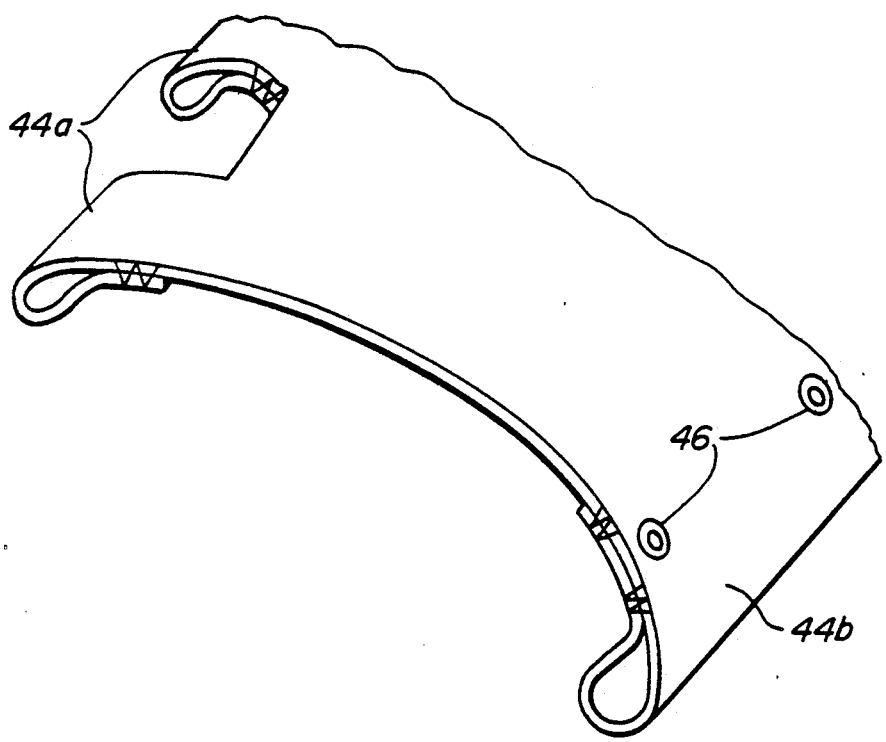
FIG._3b.

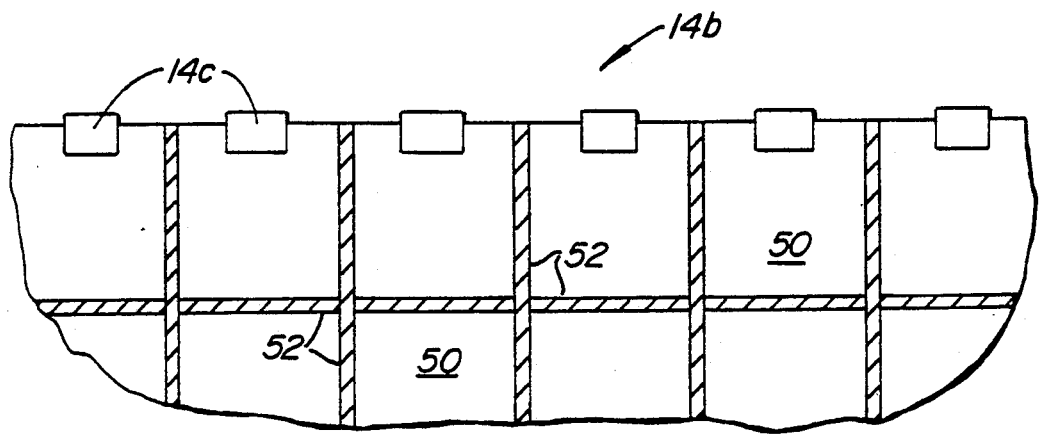
FIG._3c.
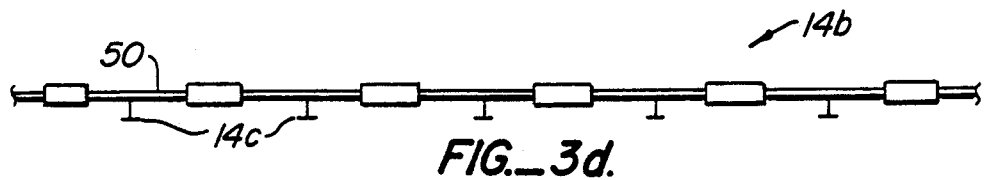
FIG._3d.
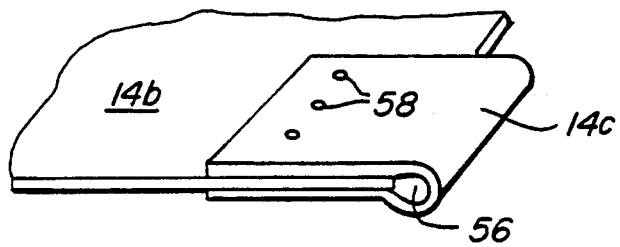
FIG._3e.
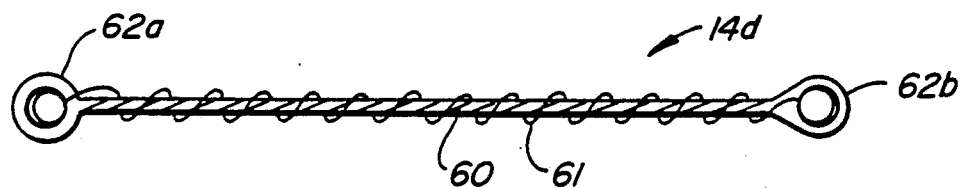
FIG._3f.

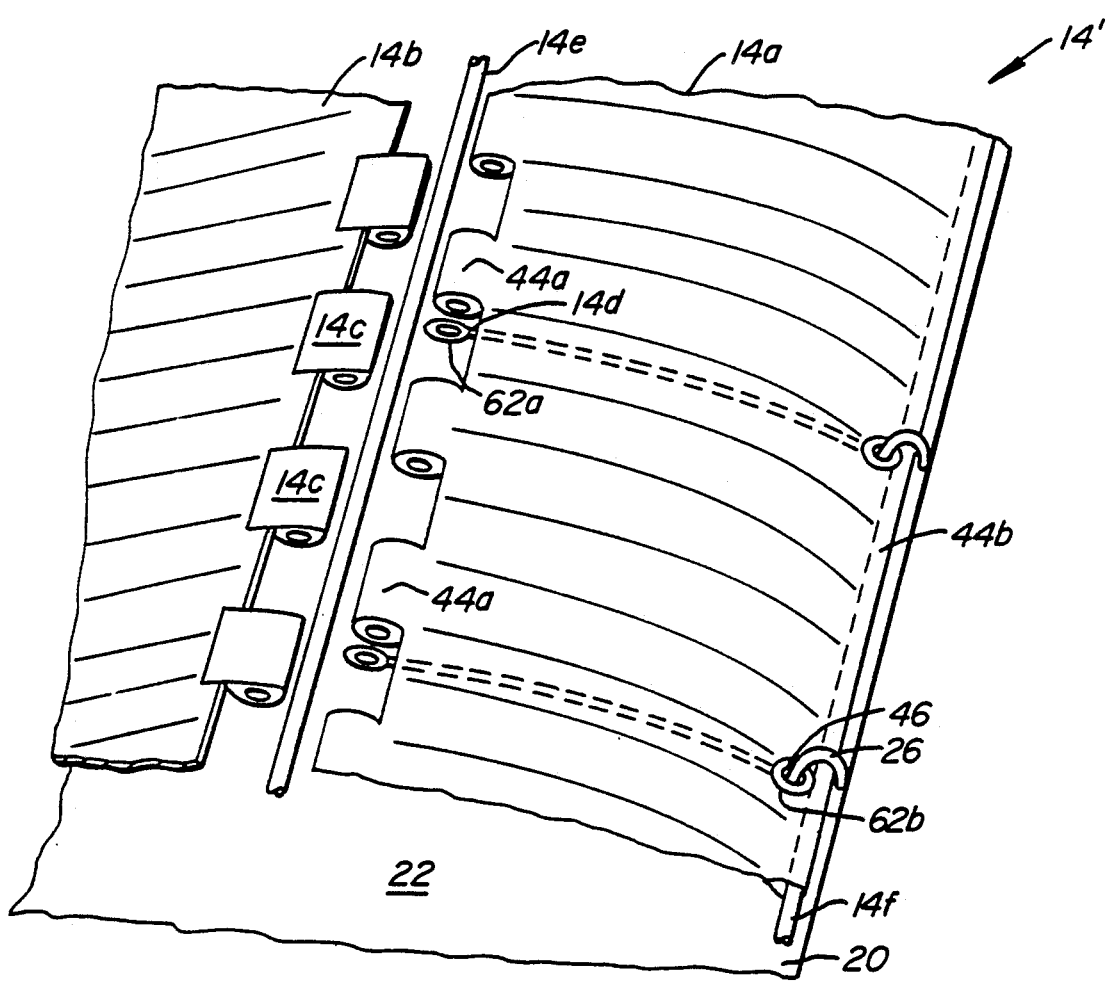
FIG._4.

WIND DRAG REDUCTION DEVICE FOR VEHICLES

BACKGROUND OF THE INVENTION

The present invention relates generally to a device for reducing aerodynamic drag on vehicles such as trucks and trailers and, more particularly, to an inflatable device for rounding the upper corners and edges of a vehicle.

Many vehicles such as trucks and trailers are constructed in a substantially box shape. The passage of such a vehicle through the atmosphere creates a large amount of drag from parasitic turbulence and various low and high pressure areas, thereby causing increased fuel consumption by the vehicle. These areas include an area of high pressure at the front of the vehicle, areas of low pressure at the top, sides and rear of the vehicle and areas of parasitic turbulence at the corners and edges of the vehicle.

Increased fuel economy can be had by constructing the vehicle with rounded surfaces and edges. Examples of these types of vehicles are disclosed in U.S. Pat. Nos. 1,880,844; 2,159,671; 2,858,580; 3,163,435; 3,253,855; 4,468,061; 4,727,814; 4,767,132; and Reissue No. 25,914. However, this type of construction is generally expensive and tends to limit the effective volume that can be utilized in most applications.

Various devices may be retrofitted to a vehicle at low cost to decrease aerodynamic drag without decreasing effective vehicular drag. Rigid devices to round the front of a vehicle are disclosed in U.S. Pat. Nos. 4,022,508 and 4,036,519. In addition, inflatable devices to round the front or rear of a vehicle are disclosed in 2,737,411; 3,814,472; 3,934,922; 4,030,779; 4,057,280; 4,088,362; 4,688,841; 4,702,509; 4,707,015 and 4,741,569.

SUMMARY OF THE INVENTION

The present invention provides an air drag reduction unit for reducing air drag caused by the upper surface, corners and edges of a vehicle such as a truck or trailer. The air drag reduction unit is an inflatable shell that is mounted onto the upper surface of the vehicle. The shell includes a flat rigid sheet surrounded by a flexible curtain. When the vehicle achieves a predetermined speed, the shell inflates due to the Bernoulli effect. The inflated shell has rounded corners and a flat upper surface several inches above the upper surface of the vehicle, thereby reducing drag. When the vehicle slows below the predetermined speed, the shell deflates. Due to the elastic nature of the shell, the shell contracts onto the upper surface of the vehicle, thereby not substantially adding to the dimensions of the vehicle when deflated.

This device may be easily and inexpensively retrofitted to existing commercial trailers. In addition, this device does not substantially increase the height of a vehicle when the device is deflated. Furthermore, this device is inflated only when needed (i.e., when the vehicle is moving).

A further understanding of the nature and advantages of the invention may be realized by reference to the remaining portions of the specification and the attached drawings.

BRIEF DESCRIPTION OF THE DRAWINGS

FIGS. 1a, 1b and 1c are side, rear and top views of one embodiment of the invention installed on a rectangular trailer and in an inflated mode;

FIG. 2a is a cutaway rear view of the shell in an inflated mode according to one embodiment of the invention;

FIG. 2b is a cutaway rear view of the shell in a deflated mode with an outline of the shell in an inflated mode;

FIGS. 3a-3f are views of the various elements of the shell; and

FIG. 4 is a cutaway perspective view of a partially assembled shell.

DESCRIPTION OF THE PREFERRED EMBODIMENTS

FIGS. 1a, 1b and 1c are side, rear and top views of a truck 10 with a trailer 12 having an inflated shell 14 attached to the upper surface of trailer 12 according to one embodiment of the invention. When inflated, shell 14 includes a rounded curtain 14a for providing a smooth curve from the side surfaces of trailer 12 to the upper surface of a rigid sheet 14b. Rigid sheet 14b is rigid and may contain rigid struts to prevent bowing either upward or downward, thereby providing a smooth flat surface several inches above the upper surface of trailer 12. The combination of rounded curtain 14a and rigid sheet 14b allows air to pass smoothly and efficiently above the upper surface of trailer 12.

The shell is inflated when the vehicle is moving due to the Bernoulli effect. That is, the vehicle's motion creates a low pressure area over the upper surface at the vehicle, thereby inflating the shell.

FIG. 2a is the cutaway rear view of trailer 12 with shell 14 in an inflated mode. As with most commercial trailers, trailer 12 has a flange 20 which is planar to the trailer's upper surface 22 and extends outwardly from trailer side surface 24. In the preferred embodiment, shell 14 is attached to flange 20 by a series of J bolts 26 along the perimeter of upper surface 22 of trailer 12. An optional triangular molding 27 constructed from wood or other material may be placed beneath bolts 26 against the trailer side surface 24 to further decrease the trailer's drag. In the embodiment shown, shell 14 includes flexible curtain 14a, rigid sheet 14b with hinge clips 14c, stiff connecting strap 14d, and rigid rods 14e and 14f. Flexible curtain 14a and stiff connecting strap 14d are coupled to hinge clips 14c of rigid sheet 14b, and to J bolts 26 by rods 14e and 14f, respectively.

An air passage way 28 for inflating the shell is shown between curtain 14a and the upper surface of the vehicle 22. An air pocket 30 is created between the shell and the upper surface of the vehicle when the shell is inflated. Stiff connecting strap 14d limits the height of rigid sheet 14b and also allows curtain 14a to billow outward, creating a curved aerodynamic shape.

FIG. 2b is a cutaway rear view of the shell in a deflated mode with an outline of the shell in a inflated mode. The shell, when deflated, returns to a flat surface caused by the elasticity of the elements of the shell. In the embodiment shown, rigid sheet 14b is inelastic such that when the shell is deflated, rod 14e moves directly downward towards the surface of the trailer. In addition, curtain 14a has elasticity such that the curtain also deflates to a flat surface. Furthermore, strap 14d is shown such that in a deflated mode, strap 14d is shorter than in the inflated mode. The relative elasticity of the members is a design choice. However, the stiff connecting means should be less elastic than the curtain to allow the curtain to billow outward. Also note that J bolt 26 allows rod 14f to rotate slightly about its axis as the shell moves between an inflated and a deflated mode.

FIG. 3a is a magnified side view of a portion of curtain 14a. The curtain expands and contracts in a vertical direction while remaining inelastic in a horizontal direction. As a result, the curtain is preferably composed of an elastic fabric such as canvas or nylon. In the embodiment shown, the fabric has inelastic horizontal threads 40 and elastic vertical threads 42a alternating with inelastic vertical threads 42b.

FIG. 3b is a cutaway end view of curtain 14a. In the embodiment shown, curtain 14a has loops 44a and 44b for inserting rods 14e and 14f, respectively. The loops may be manufactured by folding the curtain fabric and sewing the folds together. Grommets 46 are also inserted into the fabric to provide apertures for inserting J bolts 26.

FIGS. 3c and 3d are bottom and side views of rigid sheet 14b. The rigid sheet is preferably a light rigid sheet 50 composed of stiff plastic or light-gauge aluminum. In order to make the sheet as thin and light as possible, struts 52 may be attached to the bottom surface of sheet 50. The struts are preferably Tee sections adhesively bonded to a plastic rigid sheet as shown or Zee sections spot-welded to an aluminum rigid sheet. The struts maybe arranged in a grid pattern as shown or in other patterns such as diagonal. These struts help prevent the rigid sheet from bowing excessively in the inflated mode.

In the embodiment shown, the rigid sheet 14b has hinge clips 14c attached to the edges of the sheet. The hinge clips provide a means for attaching the rigid sheet to the curtain 14a and stiff connecting straps 14d by allowing a rod to pass repeatedly through each of the elements in sequence.

FIG. 3e is an enlarged perspective view of hinge clip 14c attached to rigid sheet 14b. The hinge clip has an aperture 56 for allowing a rod to pass through the clip. The hinge clip may be pop-riveted to a plastic sheet as shown by pop-rivets 58. In the alternative, clips 14c may be spot-welded to an aluminum rigid sheet.

FIG. 3f is a top view of connecting strap 14d. In the embodiment shown, the connecting strap would include a non-extensible steel cable 60 surrounded by a helical spring 61 to provide residual tension when the connecting strap is flattened to the roof as shown in FIG. 2b. The connecting strap also has loops 62a and 62b for coupling the connecting strap to rod 14e and bolt 26. Alternative embodiments include a cloth or nylon strap that is less expandable than the curtain.

FIG. 4 is a cutaway perspective drawing of a partially assembled shell 14'. Rigid sheet 14b has hinge clips 14c along its border. Curtain 14a has loops 44a along its inner border. Curtain 14a also has a loop 44b and multiple grommets 46 along its outer border. In addition, strap 14d has loops 62a and 62b at each end of the strap. The rigid sheet, curtain and strap may be connected together by passing rod 14e down through the loop of each of the shell members, thereby creating a tight interlocking shell assembly. The shell assembly is then attached to upper surface 22 at the vehicle by passing loop 62b of strap 14d and grommet 46 of curtain 14a over J bolts 26. Rod 14f is then inserted into loop 46 of curtain 14a under the J bolts, thereby securely fastening the shell assembly to the roof of the vehicle.

Alternative methods of constructing the shell assembly include sewing the shell members together or constructing the curtain and rigid sheet from a single elastomeric piece that is reinforced with struts at strategic locations. Alternative methods of attaching the shell assembly to the vehicle depend upon the type and construction of the vehicle. For example, straps may be used to harness or saddle the shell assembly to the vehicle.

As will be understood by those familiar with the art, the present invention may be embodied in other specific forms without departing from the spirit or essential characteristics thereof. For example, the straps used to limit the height of the air pocket and allow the curtain to billow may be ropes or strings constructed of a strong substance such as nylon. In addition, the straps may be attached to the vehicle at a different location than the curtain. Furthermore, the air passage ways used to inflate the shell may be located in other high pressure locations around the vehicle. Accordingly, the disclosure of the preferred embodiment of the invention is intended to be illustrative, but not limiting, of the scope of the invention which is set forth in the following claims.

What is claimed is:

1. An air drag reduction device for reducing air drag of a vehicle comprising:
   (a) a flexible shell for mounting onto the vehicle above the upper surface of the vehicle, the flexible shell comprising:
      a rigid sheet having dimensions similar to, but less than, the upper surface of the vehicle to be located above the vehicle, and
      a flexible curtain connected to the rigid sheet for mounting onto the vehicle, thereby providing an inflatable air pocket between the rigid sheet and the upper surface of the vehicle; and
   (b) at least one air passageway between the air pocket and air surrounding the vehicle such that the air pocket is inflated by the Bernoulli effect when the vehicle is moving.

2. The air drag reduction unit of claim 1 further comprising connecting means less flexible than the flexible curtain connected to the rigid sheet capable of being attached to the vehicle for limiting the height of the air pocket.

3. An air drag reduction device for reducing air drag of a vehicle comprising:
   (a) a rigid sheet having dimensions similar to, but less than the upper surface of the vehicle; and
   (b) a flexible curtain connected to the rigid sheet and capable of being mounted onto the vehicle.

4. The air drag reduction unit of claim 3 further comprising rigid struts connected to the rigid sheet for preventing the rigid sheet from bowing.

5. The air drag reduction unit of claim 3 wherein the curtain is comprised of an elastomeric material.

6. The air drag reduction unit of claim 3 further comprising a rod for connecting the curtain to the rigid sheet.

7. The air drag reduction unit of claim 3 further comprising a plurality of J bolts for mounting the curtain onto the vehicle.

8. The air drag reduction unit of claim 3 further comprising at least one air passageway between the air pocket and air surrounding the vehicle such that the air pocket is inflated by the Bernoulli effect when the vehicle is moving.

9. The air drag reduction unit of claim 3 wherein the air passageway is located between the curtain and the upper surface of the vehicle.

10. An air drag reduction device for reducing air drag of a vehicle comprising:
   (a) a rigid sheet having dimensions similar to, but less than the upper surface of the vehicle;
   (b) a flexible curtain connected to the rigid sheet and capable of being mounted onto the vehicle; and
   (c) connecting means less flexible than the flexible curtain connected to the rigid sheet and capable of being mounted onto the vehicle.

11. The air drag reduction unit of claim 10 further comprising rigid struts attached to the rigid sheet for preventing the rigid sheet from bowing.

12. The air drag reduction unit of claim 10 wherein the curtain is comprised of an elastomeric material.

13. The air drag reduction unit of claim 10 further comprising a rod for connecting the curtain and the connecting means to the rigid sheet.

14. The air drag reduction unit of claim 10 further comprising a plurality of J bolts for mounting the curtain and the connecting means onto the vehicle.

15. The air drag reduction unit of claim 10 further comprising at least one air passageway between the air pocket and air surrounding the vehicle such that the air pocket is inflated by the Bernoulli effect when the vehicle is moving.

16. The air drag reduction unit of claim 10 wherein the air passageway is located between the curtain and the upper surface of the vehicle.

17. The air drag reduction unit of claim 10 wherein the connecting means comprises an elastomeric material.

18. The air drag reduction unit of claim 10 wherein the connecting means comprises a plurality of straps.

19. An air drag reduction device for reducing air drag of a vehicle comprising:
   (a) a rigid sheet having dimensions less than the upper surface of the vehicle to be located above the vehicle;
   (b) rigid struts connected to the rigid sheet for preventing the rigid sheet from bowing;
   (c) a flexible curtain connected to the rigid sheet for mounting onto the vehicle, thereby providing an inflatable air pocket between the rigid sheet and the upper surface of the vehicle;
   (d) connecting means less flexible than the flexible curtain connected to the rigid sheet and capable of being mounted onto the vehicle for limiting the height of the air pocket;
   (e) a plurality of J bolts for connecting the curtain to the vehicle; and
   (f) at least one air passageway between the air pocket and air surrounding the vehicle such that the air pocket is inflated by the Bernoulli effect when the vehicle is moving.

* * * * *